May 29, 1962  R. L. GLOVER  3,037,109
STUD WELDING
Filed May 3, 1961  2 Sheets-Sheet 1
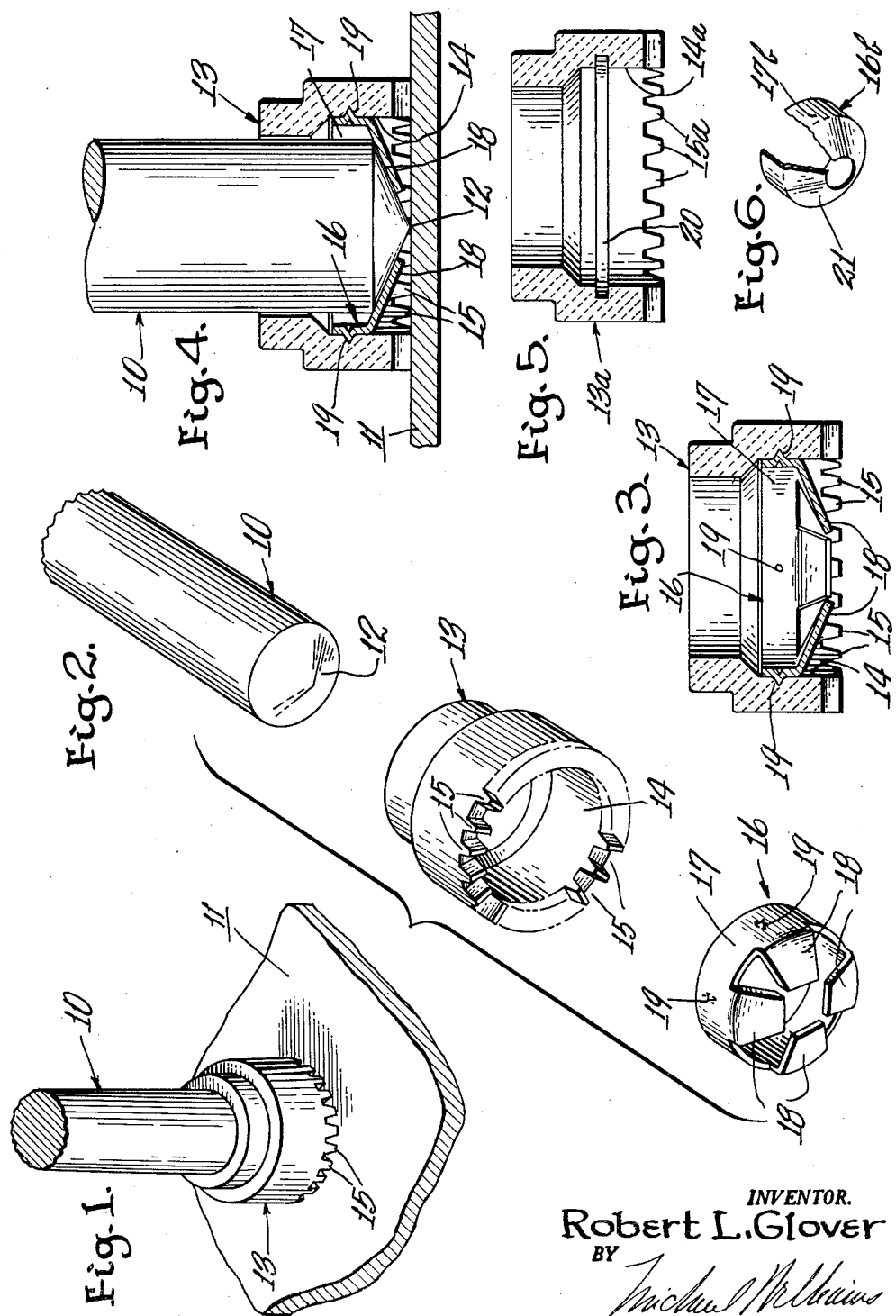
INVENTOR.
Robert L. Glover
BY
ATTORNEY May 29, 1962
R. L. GLOVER
3,037,109
STUD WELDING
Filed May 3, 1961
2 Sheets-Sheet 2
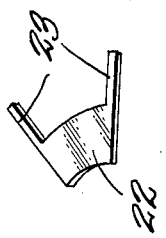
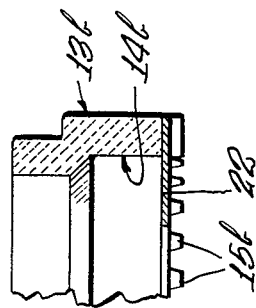
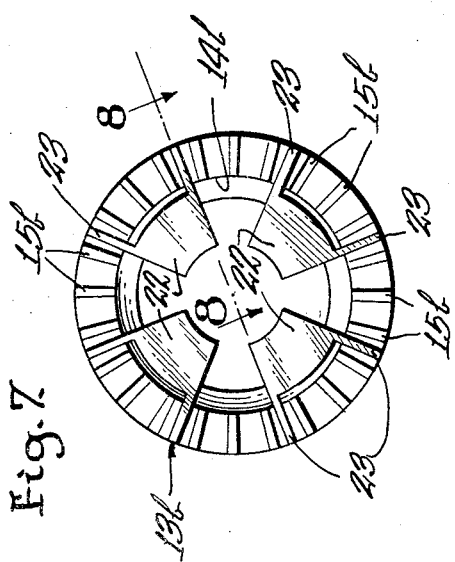
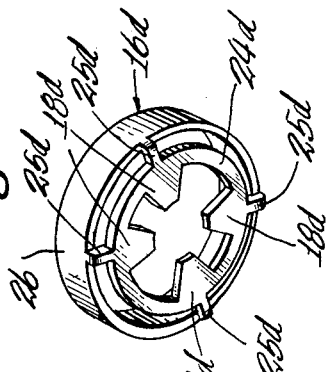
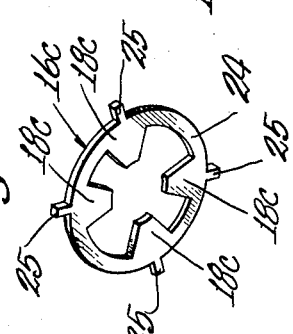
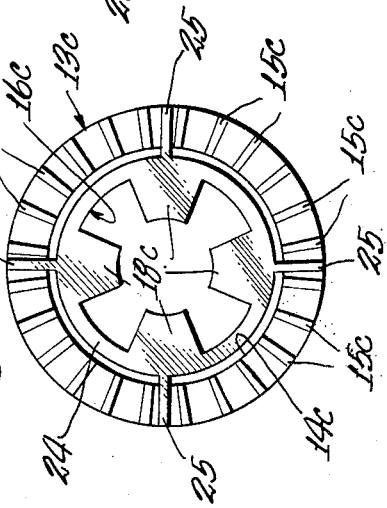
INVENTOR.
Robert L. Glover
BY
*Michael Williams*
ATTORNEY United States Patent Office 3,037,109
Patented May 29, 1962

3,037,109
STUD WELDING
Robert L. Glover, 1972 Boardman-Poland Road,
Poland, Ohio
Filed May 3, 1961, Ser. No. 107,489
22 Claims. (Cl. 219—99)

The present invention relates to the arc welding of studs and the like to a suitable member, more particularly to an improved assembly for such welding, and the principal object of the invention is to provide new and improved assemblies of the character described.

In the art of welding a stud or like body to a metal plate or other suitable member, the following mode of operation has long been practised, it being understood that suitable apparatus, forming no part of the present invention, carries out such operation: The end of the stud to be welded is first placed in contact with the plate and welding current is passed therebetween. The stud is then withdrawn slightly from the plate so as to draw an arc which soon melts the end of the stud and the adjoining portion of the plate. At this time, the melted stud end is plunged into the plate and the current turned off. The melted end of the stud and the melted plate portion soon fuse together forming a strong, welded joint.

It has been found that if the stud end is formed with a central point, more even heating of the end of the stud is accomplished since the electric arc is initially concentrated at the center of the stud end. It has also been found that a superior and more consistent weld will be effectuated, especially under adverse operating conditions, if the weld area is enclosed. This is usually effectuated by positioning a sleeve-like, ceramic ferrule over the stud end with one end of the ferrule seated against the plate. The ferrule thus confines the molten metal and shields it from the atmosphere.

While not always essential, the addition of the proper amount of flux material to the weld formed as above-outlined results in consistently better welds. The flux material seems to render the operation much less sensitive to otherwise critical factors such as the amount of welding current and the duration of its application. Heretofore, aluminum has been satisfactorily used as a flux material, the aluminum sometimes being employed in pure, solid state and sometimes being finely divided and mixed with other types of material.

Many different types of assemblies have been devised for introducing the aluminum flux material into the weld; however, even the most satisfactory of these from a functional point of view have been quite costly. Many types have not only been unduly high in cost but have also introduced improper quantities of the flux and at the wrong place whereby the beneficial effects of the flux material has largely been lost.

The present invention provides a stud-ferrule assembly having a novel arrangement for the introduction of flux material. This assembly is exceedingly flexible to meet varying conditions of use and is easy to handle and low in cost. These and other advantages will readily become apparent from a study of the following description and from the drawings appended hereto.

In the drawings accompanying this specification and forming a part of this application there is shown, for purpose of illustration, embodiments which the invention may assume, and in these drawings:

FIGURE 1 is a perspective view showing a stud-ferrule assembly of a preferred embodiment of the present invention in position for welding to a plate or the like, FIGURE 2 is an enlarged, exploded perspective view of the assembly seen in FIGURE 1, FIGURE 3 is an enlarged sectional view of certain parts seen in FIGURE 2 in assembled relation with each other, FIGURE 4 is a view similar to FIGURE 3 but showing, in assembled relation, all the parts seen in FIGURES 1 and 2, FIGURE 5 is a view similar to FIGURE 3 but illustrating a modified detail, FIGURE 6 is a reduced size, broken perspective view illustrating another modified detail, FIGURE 7 is a bottom plan view of still another flux-ferrule assembly, FIGURE 8 is a half-sectional view generally corresponding to the line 8—8 of FIGURE 7, FIGURE 9 is a perspective view of one of the flux member portions seen in FIGURES 7 and 8, FIGURE 10 is a view similar to FIGURE 7 but of another embodiment, FIGURE 11 is a reduced size perspective view of the flux member seen in FIGURE 10, and FIGURE 12 is a view like FIGURE 11 but of a modified structure.

With reference to FIGURE 1, there is illustrated a stud 10 which is to be welded to, for example, a plate 11. The lower (in the position of parts shown) end of stud 10 will preferably be cylindrical in form (FIGURES 2 and 4) with its terminal portion conical to provide an axially extending, central point 12 for a purpose to be seen.

Loosely fitting over the lower end of the stud 10 is a heat-resistant ferrule 13 formed of, for example, a suitable ceramic material. The lower end of the ferrule is provided with an internal enlargement 14 adjacent the terminal end of the stud (see especially FIGURE 4) and a series of teeth 15 are formed in the ferrule to permit the gases generated by welding to escape from its interior.

The novel arrangement for introducing flux during welding of the stud 10 to the plate 11 is best seen in FIGURE 2 to presently comprise a sheet metal body 16 of aluminum or other suitable flux material. Such body has a tubular portion 17 of a size to closely fit within the enlargement 14 of the ferrule and a plurality of fingers 18 (herein shown to be four in number) structurally integral with the tubular body portion and extending radially inwardly of one end thereof.

As viewed in FIGURE 4, fingers 18 are inclined to more or less match the conical stud end and such fingers terminate short of each other to permit the stud point 12 to directly engage the plate 11. Obviously, the fingers 18 can be increased or decreased in number from that shown or increased or decreased in width to control the amount of flux which will be added to the weld.

Along with the novel form of the flux body 16, novel means are employed to retain the body in position with the stud-ferrule assembly. Heretofore, it has been proposed to secure a sheet metal body to a stud, in certain cases the sheet metal body functioning as a cover to retain flux material in a cavity in the stud and in other cases the body itself providing the fluxing action. In any event, the prior constructions were quite expensive to manufacture whereas the present invention contemplates an inherently lower cost expedient of securing the flux body 16 to the ferrule 13.

As previously mentioned, tubular portion 17 of flux body 16 closely fits within the ferrule enlargement 14 and if desired, the flux body could be sprung into position to retain the parts assembled. However, for various reasons, one of which is the very low resiliency of pure aluminum, it is preferable to retain the body assembled with the ferrule by striking projections 19 radially outwardly of the tubular body portion 17 (see FIGURES 2, 3 and 4) at circumferentially spaced places thereof. As projections 19 are struck out, with the body inserted as shown in the ferrule internal enlargement 14, indentations in the brittle ferrule are formed in which the projections seat. This arrangement effectively interlocks the ferrule and the body 16 together against unintentional disassembly.

In the embodiment seen in FIGURE 5, the ferrule 13a has an annular groove 20 formed in its internal enlargement 14a. In this embodiment, the body projections will be struck out to seat in the groove 20 to thus effectively prevent unintentional disassembly of the body and the ferrule.

In the embodiment seen in FIGURE 6, the modified flux body 16b takes the form of a cup having its bottom 21 centrally apertured to pass the stud point and arranged for more or less complementary engagement with the conical stud end. Body 16b may be assembled with a ferrule in a manner similar to that shown in FIGURE 3 or with a ferrule of the type shown in FIGURE 5.

In the embodiment seen in FIGURE 7, the flux means comprises a plurality (herein shown to be four) of sheet metal members 22 of aluminum or the like having an arcuate configuration. As best seen in FIGURE 9, each arcuate member 22 has radially outwardly projecting tabs 23 which fit between the teeth 15b of the ferrule 13b. At the present time, the members 22 are adapted to be spaced circumferentially of each other within the ferrule enlargement 14b, each member projecting radially inwardly of the ferrule toward the stud (not shown) but terminating short of the latter in the same manner and for the same purpose as the previously described flux body fingers 18. Although other expedients could be employed, it is presently contemplated that the tabs 23 of the members 22 will be cemented to the ferrule to retain the latter and the members in assembled relation.

In the embodiment seen in FIGURES 10 and 11, the flux body 16c is in the form of a sheet metal ring 24 having fingers 18c extending radially inwardly thereof. Extending radially outwardly of the ring 24 are tabs 25, the ring being adapted to be positioned within the ferrule enlargement 14c with the tabs disposed between the ferrule teeth 15c. Here again, it is contemplated that the tabs will be cemented to the ferrule.

The flux body 16d seen in FIGURE 12 is similar to 16c shown in FIGURE 11; however, in this embodiment, the tabs 25d are structurally integral with a tubular portion 26 proportioned to fit over the exterior of the ferrule. Tubular portion 26 may frictionally fit with the exterior of the ferrule to hold the flux body assembled therewith, the tabs 25d fitting between the ferrule teeth as previously described. Alternatively, the body tubular portion may be dimpled in a manner similar to the body 16 to retain it assembled with the ferrule or such portion could be cemented to the ferrule.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. In combination: a welding stud having one end which is to be welded to a suitable member, a heat-resistant, sleeve-like ferrule enclosing said one stud end, and a body of flux material anchored within said ferrule adjacent said one stud end, said flux material body and said ferrule having cooperating, interengageable portions for retaining them in assembled relation.

2. In combination: a welding stud having one end which is to be welded to a suitable member, a heat-resistant, sleeve-like ferrule enclosing said one stud end, and a body of flux material anchored within said ferrule adjacent said one stud end, said flux material body having a radially outwardly projecting portion fitting within a cooperating indentation in the inner surface of said ferrule.

3. In combination: a welding stud having one end which is to be welded to a suitable member, a heat-resistant, sleeve-like ferrule enclosing said one stud end and having radially extending slots adjacent the latter, and flux means carried by said ferrule adjacent said one stud end and having portions fitting within respective ferrule slots.

4. The construction of claim 3 wherein said flux means portions are cemented within respective slots of said ferrule to retain the latter assembled with said flux means.

5. In combination: a welding stud having one end which is to be welded to a suitable member, a heat-resistant, sleeve-like ferrule enclosing said one stud end and providing an annular space thereadjacent, and flux means within said annular ferrule space comprising a plurality of circumferentially spaced, sheet metal fingers supported by said ferrule and projecting radially inwardly thereof toward said one stud end.

6. The construction of claim 5 wherein said one stud end has a central axial projection for concentrating an electric arc between the stud and the member to which it is to be welded and wherein said sheet metal fingers terminate short of said stud projection to provide for direct engagement of the latter with the member to which said stud is to be welded.

7. The construction of claim 6 wherein the end of said ferrule adjacent said one stud end has a plurality of circumferentially spaced, radially extending slots, wherein each sheet metal finger has a pair of spaced tabs fitting within respective ferrule slots for locating each finger relative to said ferrule, and wherein said finger tabs are cemented within respective slots of said ferrule to retain the latter and said fingers in assembled relation.

8. The construction of claim 1 wherein said flux material body is annular and formed of sheet metal and has a plurality of radially inwardly projecting fingers adjacent said one stud end and intermediate the latter and the member to which the stud is to be welded.

9. The construction of claim 2 wherein said flux body has a plurality of projecting portions spaced circumferentially thereabout for cooperation with said ferrule.

10. In combination: a welding stud having at one end a central, axial projection for concentrating an electric arc between the stud and a member to which it is to be welded, a heat-resistant, sleeve-like ferrule of ceramic-like material enclosing said one stud end, and an annular, sheet metal body of flux material disposed within said ferrule and having a radially outwardly projecting portion fitting within a cooperating indentation in the inner surface of said ferrule for retaining the latter and said body in assembled relation, said body having a plurality of radially inwardly projecting fingers adjacent said one stud end and intermediate the latter and the member to be welded and said fingers each terminating short of said stud projection for direct engagement of the latter with said member.

11. The construction of claim 10 wherein said flux body has a plurality of projecting portions spaced circumferentially thereabout and fitting within respective indentations in said ferrule inner surface.

12. The construction of claim 10 wherein said flux body has a plurality of projecting portions spaced circumferentially thereabout and fitting within an annular groove in said ferrule inner surface.

13. In combination: a welding stud having at one end a central, axial projection for concentrating an electric arc between the stud and a member to which it is to be welded, a heat-resistant, sleeve-like ferrule of ceramic-like material enclosing said one stud end, and a sheet metal body of flux material having a tubular portion closely fitting within said ferrule and said tubular portion having a plurality of radially outwardly projecting portions spaced circumferentially thereabout and each of such portions fitting within a cooperating indentation in the inner surface of said ferrule for retaining the latter and said body in assembled relation, said tubular body portion having a plurality of structurally integral, radially inwardly projecting fingers spaced circumferentially of each other adjacent said one stud end and each finger terminating short of said stud projection for direct engagement of the latter with said member.

14. In combination: a welding stud having one end which is to be welded to a suitable member, a heat-resistant, sleeve-like ferrule enclosing said one stud end, and flux means carried by said ferrule adjacent said one stud end and providing a plurality of radially inwardly projecting fingers.

15. The construction of claim 14 wherein said stud end has a central axial projection for concentrating an electric arc between the stud end and the member to which it is to be welded, and wherein said flux means fingers each terminate short of said stud projection for direct engagement of the latter with said member.

16. The construction of claim 14 wherein said ferrule has radially extending slots at one end thereof and wherein said flux means has tabs fitting in said ferrule slots.

17. The construction of claim 16 wherein said flux means tabs are cemented within said ferrule slots to retain said flux means assembled with said ferrule.

18. In combination: a welding stud having one end which is to be welded to a suitable member, a heat-resistant, sleeve-like ferrule enclosing said one stud end, and a sheet metal flux body carried by said ferrule adjacent said one stud end and having a tubular portion closely fitting over the exterior of said ferrule to secure the latter and said body together.

19. The construction of claim 16 wherein the end of said ferrule adjacent said one stud end provides an annular space enclosing the latter, wherein such ferrule end has radially extending slots, wherein said flux body has a portion disposed within the annular space aforesaid, and wherein tabs are disposed within said ferrule slots and extend between said body tubular portion and said body portion in said annular space for connection purposes.

20. The construction of claim 19 wherein said stud end has a central axial projection for concentrating an electric arc between the stud and the member to which it is to be welded, and wherein said flux body portion in said annular space is generally ring-like with a plurality of radially inwardly directed fingers each terminating short of said stud projection for direct engagement of the latter with said member.

21. The construction of claim 1 wherein said body of flux material has a radially outwardly projecting portion engaged with said ferrule for assembly purposes.

22. The construction of claim 1 wherein said body of flux material is sheet metal having a structurally integral, radially outwardly projecting portion engaged with said ferrule for assembly purposes.

References Cited in the file of this patent

UNITED STATES PATENTS

| | | |
|---|---|---|
| 2,413,370 | Palmer | Dec. 31, 1946 |
| 2,455,244 | Evans | Nov. 30, 1948 |
| 2,459,957 | Palmer | Jan. 25, 1949 |